US006222353B1

(12) United States Patent
Pattamatta et al.

(10) Patent No.: US 6,222,353 B1
(45) Date of Patent: Apr. 24, 2001

(54) VOLTAGE REGULATOR CIRCUIT

(75) Inventors: Srinivas Pattamatta, San Jose; Paul Ta, Fremont, both of CA (US)

(73) Assignee: Philips Semiconductors, Inc., Tarrytown, NY (US)

( * ) Notice: Subject to any disclaimer, the term of this patent is extended or adjusted under 35 U.S.C. 154(b) by 0 days.

(21) Appl. No.: 09/583,325

(22) Filed: May 31, 2000

(51) Int. Cl.[7] .................................................. G05F 1/40
(52) U.S. Cl. .......................... 323/269; 323/901; 323/281
(58) Field of Search .................................... 323/901, 269, 323/281, 284, 238

(56) References Cited

U.S. PATENT DOCUMENTS 5,012,178 * 4/1991 Weiss et al. ......................... 323/269
5,512,814 * 4/1996 Allman ................................ 323/267

* cited by examiner

*Primary Examiner*—Shawn Riley

(57) ABSTRACT

The performance of the main regulatory transistor of an on-chip voltage regulator circuit is enhanced when the main transistor is appropriately biased during start up. In an example embodiment, a voltage regulator circuit includes a thin gate oxide transistor as the main regulatory transistor and an operational amplifier that is referenced to a midlevel operating voltage. During start-up, the potential voltage difference is large enough to necessitate the disconnection of the main transistor from the operational amplifier. A voltage divider ladder circuit is used to maintain the gate voltage of the main transistor at the midlevel voltage while a smaller thick gate oxide transistor is used to maintain loop stability and to withstand voltage transients.

20 Claims, 2 Drawing Sheets

VOLTAGE REGULATOR CIRCUIT

FIELD OF THE INVENTION

The present invention relates generally to voltage regulator circuits and, more particularly, to a voltage regulator circuit incorporated in an integrated circuit.

BACKGROUND OF THE INVENTION

Many of the modern electrical devices require power at voltages different from the nominal 110V or 220V supplied by utility companies to homes, offices and factories. Transformers or voltage regulators contained within the electrical devices usually provide the necessary voltage conversions. Voltage regulators also prevent surges or spikes in line voltage during start-up when an electrical device is switched on. The surges or spikes of voltage typically cause damage or failure of electrical or electronic circuits within the device unless a voltage regulator is included to control the spikes and surges. Thus, voltage regulators are important components of electrical circuits, particularly in regard to integrated circuits that are widely used in many electrical devices.

A prior art example of an on-chip voltage regulator circuit includes an operational amplifier referenced to a reference voltage (about 1.8V) that regulates the current supplying a transistor. A bandgap generator typically generates a stable voltage reference for the operational amplifier. An internal node Vdd is regulated to a midlevel voltage by the regulator circuit while an external Vdd voltage is supplied to the pin of the chip. When the current and, as a result, the voltage at the internal Vdd changes, the operational amplifier regulates a gate voltage of the transistor to supply the required current while keeping Vdd at a reference voltage.

During normal operation, since the difference between any two terminal voltages of the transistor would not exceed the reference voltage, there would not be any reliability problems. However, during startup the device capacitive members are not fully charged and the gate or the source of the transistor will approach the supply limit. This will result in a voltage corresponding to the supply limit being imposed across the gate oxide layer of the transistor, which exceeds the breakdown limit of the gate oxide and damages the transistor.

SUMMARY OF THE INVENTION

The present invention is directed to addressing the above and other needs in connection with improving a voltage regulator circuit that selectively couples the voltage of a voltage source to a voltage regulator circuit during device power-up. The present invention is exemplified in a number of implementations and applications, some of which are summarized below.

According to one aspect of the invention, it has been discovered that by appropriately biasing the main regulatory transistor of the voltage regulator circuit at start up the integrity of the transistor will be enhanced while the circuit loop stabilizes. The voltage regulator circuit includes a first current supplying transistor circuit disposed between the voltage source and the voltage drain, the first transistor circuit being regulated by a voltage referenced control circuit selectively coupled to control a gate of the first transistor circuit. A voltage biasing control circuit coupled to the gate of the first current supplying transistor circuit is adapted to provide a voltage bias to the first transistor circuit gate during power-up when the voltage referenced control circuit is electrically decoupled from controlling the first transistor circuit gate. The voltage referenced control circuit regulates a second current supplying transistor circuit disposed between the voltage source and the voltage drain. The voltage referenced control circuit is coupled to and continuously controls a gate of the second transistor circuit to maintain a control loop for the voltage regulator circuit during power-up.

According to another aspect of the invention, a voltage regulator circuit disposed between a voltage source and a voltage drain includes a first current supplying transistor member, disposed between the voltage source and the voltage drain, that is reversibly regulated by a voltage referenced operational amplifier. A voltage divider resistor ladder member, coupled in parallel with the first current supplying transistor, includes a first and a second resistor member in series. The resistor ladder member is reversibly regulated (or switchable) by the voltage referenced operational amplifier that is coupled to the ladder member at a node between the two resistive members. A second transistor member is coupled in parallel with the first current supplying transistor member and the voltage divider resistor ladder member and is irreversibly regulated (not switchable as in "reversibly regulated") by the voltage referenced operational amplifier.

The above summary of the present invention is not intended to describe each illustrated embodiment or every implementation of the present invention. The figures and detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
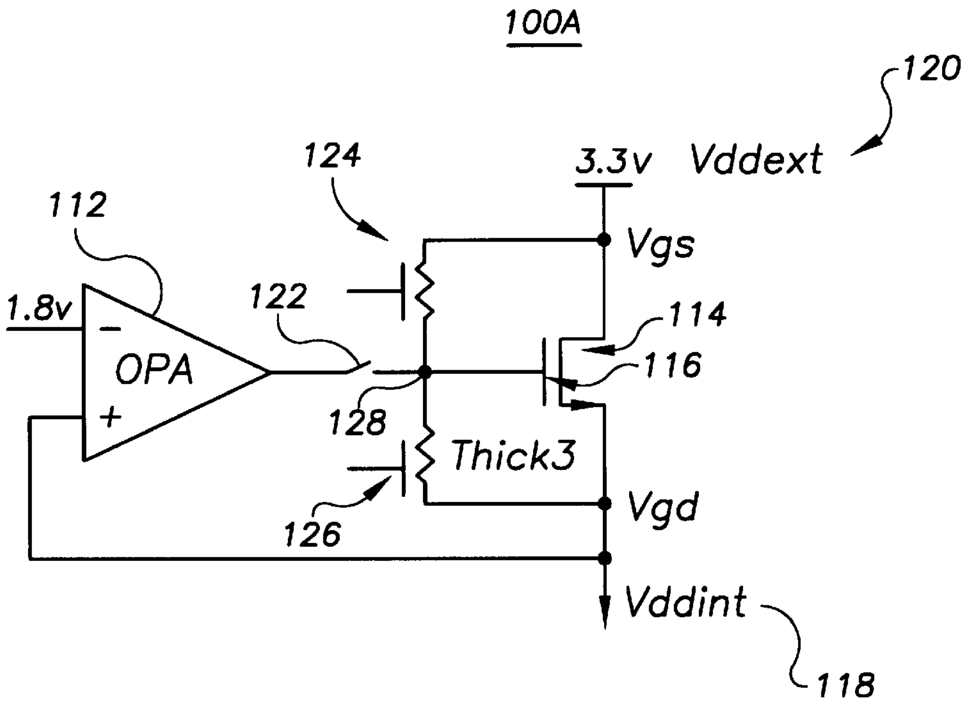
FIG. 1 is a schematic diagram of an example voltage regulator circuit in an intermediate stage of transition in accordance with one embodiment of the invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to a voltage regulating circuit arrangement and it has been found to be particularly suited for integrated circuit voltage regulation. While the present invention is not necessarily limited to such integrated circuit arrangements, the invention will be better appreciated using a discussion of exemplary embodiments in such a specific context.

In an example embodiment, a voltage regulator circuit includes a thin gate oxide transistor, disposed between a voltage source and a voltage drain, that is regulated by a voltage referenced operational amplifier. A voltage divider resistor ladder, that includes two resistive members, is coupled in parallel with the thin gate transistor and is reversibly regulated by the operational amplifier that is coupled to a node between the resistive members. A thick gate oxide transistor that is irreversibly regulated by the operational amplifier is coupled in parallel with the thin gate oxide transistor and the voltage divider resistor ladder. The thick gate transistor and the resistor ladder operate to bias the main transistor of the voltage regulator circuit to enhance its performance while the circuit loop becomes stable during start-up.

Figure 2:
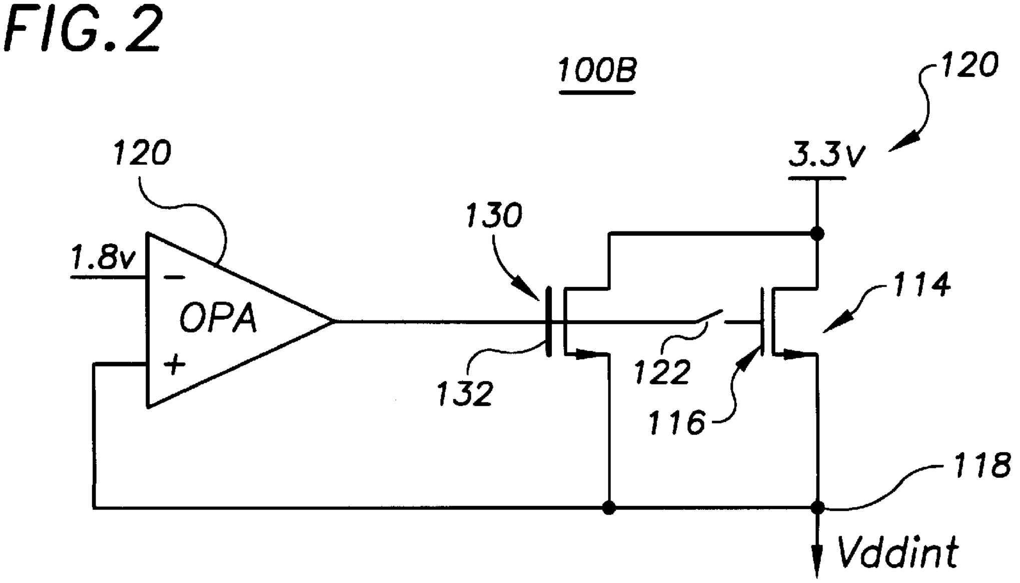
FIG. 2 is a schematic diagram of an example voltage regulator circuit in an intermediate stage of transition in accordance with one embodiment of the invention.
Figure 3:
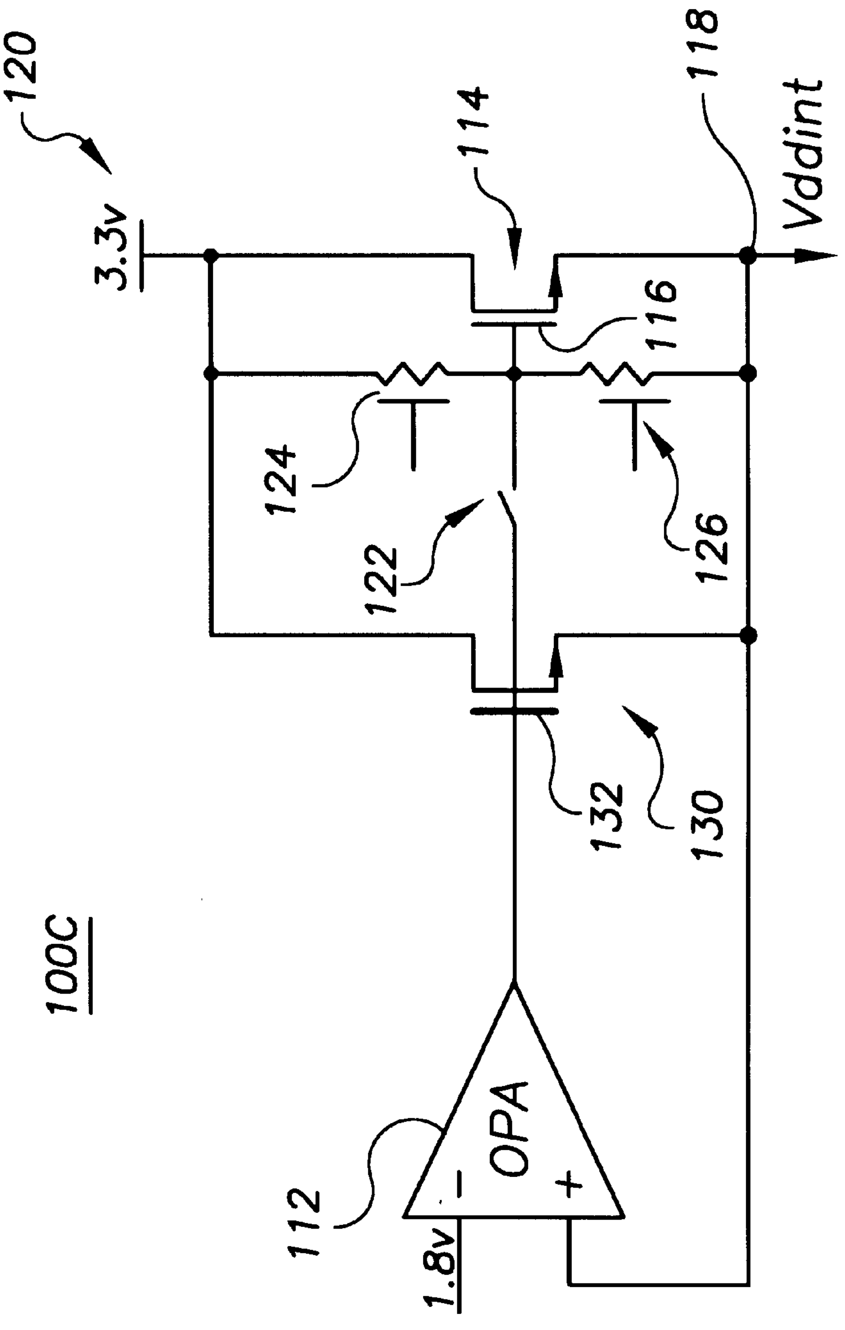
FIG. 3 is a schematic diagram of an example voltage regulator circuit incorporated in an integrated circuit in accordance with one embodiment of the invention.

Referring now to FIGS. 1–3, the complete implementation of an example embodiment of the invention is illustrated in FIG. 3. However, a brief description of the main components of the example embodiment as well as a discussion on the intermediate stages of transition from the initial circuit to the example embodiment will be useful in understanding fully the teachings embodied in the example embodiment. FIG. 3 illustrates a voltage regulator circuit 100C that includes an operational amplifier 112, a first transistor 114, a second transistor 130 that has its gate controlled by amplifier 112, a third transistor 124 and a fourth transistor 126. The operation of circuit 100C will be discussed in detail further on in the specification.

FIG. 1 illustrates the first of two levels of transition wherein circuit 100A includes operational amplifier 112 (hereinafter OPA) referenced to a voltage of 1.8V that regulates the first current supplying transistor 114 having a gate 116. In this example, first transistor 114 is a thin gate oxide transistor. A bandgap generator (not shown) generates the 1.8V stable voltage reference for OPA 112. Circuit 100A is coupled (at the voltage drain) between an internal node $Vdd_{int}$ 118, which is regulated to a voltage of 1.8V by OPA 112, and (at the voltage source) an external $Vdd_{ext}$ 120 which supplies 3.3V to the pin of transistor 114.

In the first transition stage, it is highly desirable to ensure that during power-up/start-up the Vgs (gate-source voltage) or Vgd (gate-drain voltage) of the first transistor 114 do not exceed 2V (based on reliability guidelines). This is accomplished by disconnecting gate 116 of transistor 114 from OPA 112 via a switch 122 and then connecting a voltage divider resistor ladder circuit arrangement between the drain, gate and source of transistor 114. The voltage divider resistor ladder includes two resistive members 124 and 126 that have a node 128 therebetween. In this example, the resistive members include third transistor 124 and fourth transistor 126 that are actually thick gate oxide transistors that operate as resistors. By disconnecting gate 116 from OPA 112, the voltage at gate 116 will always be midway between the drain and source of transistor 114. At the extreme, the Vgs or Vgd have a maximum value of 1.65V (50% of 3.3V). Upon stabilization of $Vdd_{int}$ 118, OPA 112 is switched back in and resistive members 124 and 126 are disconnected. Since the resistive members in this example are transistors, controlling the gates of the transistors easily disconnects the resistive members.

Referring to FIG. 2, circuit 100B illustrates the transition to the second level that addresses the issue of having an open loop in the voltage regulator circuit during power-up/start-up. The output voltage of OPA 112 is at the same level as the power supply rails due to the open loop condition. Upon closing the loop (via switch 122), the voltage will exceed the Vgs or Vgd limits until the loop stabilizes, during which time damage occurs to the other components of the voltage regulator circuit. In one example, second transistor 130 includes a thick gate oxide transistor having a gate 132 that is coupled in parallel with first transistor 114 to keep the loop closed at all times. A thick gate oxide transistor is used for second transistor 130 due to its capability of withstanding both a high voltage difference between the transistor terminals and a breakdown during the power-up/start-up mode. Second transistor 130 need only keep the loop closed; therefore in this example the transistor is a small device that does not add much space in terms of circuit density. In normal operation, transistor 130 acts in parallel to transistor 114 and helps in voltage regulation, thereby not requiring disconnection.

Referring to FIG. 3, circuit 100C illustrates the example embodiment of the invention incorporating the transition levels previously described. Not shown in circuit 100C is a comparator circuit that disconnects the two voltage divider resistors once the node Vdd 118 reaches close to a voltage 1.8V. A bandgap generator that is also not shown provides the reference voltage of 1.8V. Voltage regulator circuit 100C advantageously enhances the main transistor's performance during swings in voltage during start up and prevents the condition of imposing the total voltage of a voltage source across the regulator circuit components. In one example integrated circuit application, voltage regulator circuit 100C regulates the 3.3V voltage source to 1.8 volts.

In this example, first transistor 114 is a thin gate oxide transistor that forms part of the first current supplying transistor circuit that is controlled by gate 116. The thin gate transistor is capable of supplying large amounts of current, in the order of 100 mA, within an integrated circuit. First transistor 114 is regulated by a voltage referenced control circuit that, in this example, is operational amplifier 112 that is selectively coupled to control gate 116 of first transistor 114. In one example integrated circuit application, operational amplifier 112 is referenced to 1.8V by a band gap generator.

A voltage biasing control circuit, that includes resistive members 124 and 126 in series, is coupled in parallel with first transistor 114 and adapted to control gate 116. In an example application, resistive members 124 and 126 are thick gate oxide transistors operated as resistors in a voltage divider ladder arrangement. By controlling the gates of third transistor 124 and fourth transistor 126, transistors 124 and 126 are disconnected. The resistive members 124 and 126, as the voltage biasing control circuit, are adapted to provide a voltage bias to gate 116 during power-up when OPA 112 is electrically decoupled from controlling gate 116 of first transistor 114.

Second transistor 130 forms part of a second current supplying transistor circuit between voltage source 120 and voltage drain 118 and is regulated by OPA 112. OPA 112 is coupled to and continuously controls gate 132 of the second transistor circuit to maintain a control loop for the voltage regulator circuit 100C during power-up. Although not shown in FIG. 3, circuit 100C includes various capacitors that are used at the $Vdd_{int}$ node and by gate 116 of first transistor 114. The on-chip voltage regulator circuit 100C is adapted to operate in a voltage range of 3.3V to 1.8V and is fabricated in a 3.3V/1.8V/0.2 $\mu$m dual voltage semiconductor (CMOS) process. The process is adapted to support the manufacture of both 3.3V and 1.8V transistors with the transistors being operable within the range of 5V to 2V. However, the teachings of the present invention are not necessarily limited to these voltage levels and device dimensions. In another example embodiment, the voltage regulator circuit is incorporated into a voltage regulator system that includes a series of voltage regulator circuits in multiple integrated circuits.

While the present invention has been described with reference to several particular example embodiments, those skilled in the art will recognize that many changes may be made thereto without departing from the spirit and scope of the present invention, which is set forth in the following claims.

What is claimed is:

1. A voltage regulator circuit disposed between a voltage source and a voltage drain, the regulator circuit comprising:

a first current supplying transistor circuit disposed between the voltage source and the voltage drain, the first transistor circuit regulated by a voltage referenced control circuit selectively coupled to control a gate of the first transistor circuit;

a voltage biasing control circuit coupled to the gate of the first current supplying transistor circuit, the voltage biasing control circuit adapted to provide a voltage bias to the first transistor circuit gate during power-up when the voltage referenced control circuit is electrically decoupled from controlling the first transistor circuit gate; and a second current supplying transistor circuit disposed between the voltage source and the voltage drain adapted to be regulated by the voltage referenced control circuit, the referenced voltage control circuit coupled to and continuously controlling the gate of the second transistor circuit to maintain a control loop for the voltage regulator circuit during power-up.

2. The regulator circuit of claim 1, wherein the second transistor circuit is coupled in parallel to the first transistor circuit.

3. The regulator circuit of claim 1, wherein the first transistor circuit includes a thin gate oxide transistor.

4. The regulator circuit of claim 1, wherein the voltage biasing control circuit is coupled in parallel with the first transistor circuit, the biasing control circuit including a voltage divider resistor ladder member.

5. The regulator circuit of claim 4, wherein voltage divider resistor ladder member includes two resistive members disposed in series.

6. The regulator circuit of claim 5, wherein the resistive members include a third and fourth transistor adapted to decouple the resistor ladder member when the voltage reference circuit is coupled to the first transistor after power-up, wherein the third and fourth transistors include thick gate oxide transistors.

7. The regulator circuit of claim 6, wherein the second transistor circuit is coupled in parallel to the first transistor.

8. The regulator circuit of claim 7, wherein the second transistor includes a thick gate oxide transistor.

9. The regulator circuit of claim 2, wherein the second transistor includes a thick gate oxide transistor.

10. A voltage regulator circuit between a voltage source and a voltage drain, the voltage regulator circuit comprising:

a first transistor disposed between the voltage source and the voltage drain, the first transistor member reversibly regulated by a voltage referenced operational amplifier;

a voltage divider resistor ladder arrangement coupled in parallel with the first current supplying transistor, the voltage divider resistor ladder arrangement including a first and a second resistive member in series, the resistor ladder arrangement reversibly regulated by the voltage referenced operational amplifier that is coupled thereto at a node between the resistive members; and a second transistor coupled in parallel with the first transistor and with the voltage divider resistor ladder arrangement, the second transistor irreversibly regulated by the voltage referenced operational amplifier.

11. The regulator circuit of claim 10, wherein the first transistor includes a thin gate oxide transistor.

12. The voltage regulator circuit of claim 10 wherein the second transistor includes a thick gate oxide transistor.

13. The voltage regulator circuit of claim 12 wherein the first and second resistive members include a third and fourth transistor, each of the transistors composed of thick gate oxide transistors.

14. The voltage regulator circuit of claim 13, wherein the third and fourth transistors are adapted to decouple the resistor ladder arrangement when the voltage reference circuit is coupled to the first transistor after power-up.

15. The voltage regulator circuit of claim 10, wherein the regulator circuit is incorporated into an integrated circuit.

16. The voltage regulator circuit of claim 15, wherein the regulator circuit within an integrated circuit is designed in a 3.3V/1.8V/0.2 μm dual voltage semiconductor fabrication process.

17. The regulator circuit of claim 16, wherein the voltage operating range of the regulator circuit is from about 5V to about 2V.

18. A voltage regulator system for preventing imposing total source voltage across regulator circuit components during start up of an electrical system, the regulator system comprising:

a first current supplying transistor circuit arrangement disposed between two terminal voltages adapted to be regulated by a voltage referenced control circuit arrangement, the voltage referenced control circuit selectively coupled to and controlling a gate of the first transistor circuit arrangement;

a voltage biasing control circuit arrangement coupled to the gate of the first current supplying transistor circuit arrangement, the voltage biasing control circuit arrangement adapted to provide a voltage bias to the first transistor circuit gate during power-up when the voltage referenced control circuit is electrically decoupled from controlling the first transistor circuit gate; and a second current supplying transistor circuit arrangement disposed between the terminal voltages adapted to be regulated by the voltage referenced control circuit, the voltage referenced control circuit coupled to and continuously controlling the gate of the second transistor circuit arrangement to maintain a control loop for the voltage regulator system during power-up.

19. The system of claim 18, wherein the voltage biasing control circuit arrangement includes a voltage divider resistor ladder arrangement having a plurality of thick gate oxide transistors adapted to operate as resistive members.

20. The system of claim 19, wherein the second transistor circuit arrangement includes a plurality of thick gate oxide transistors disposed in parallel to the first transistor circuit arrangement.

* * * * *